United States Patent [19]

Tominaga et al.

[11] Patent Number: 4,478,801
[45] Date of Patent: Oct. 23, 1984

[54] METHOD FOR PURIFYING EXHAUST GASES WITH HYDROGENSULFATES

[75] Inventors: Hiroo Tominaga, Matsudo; Kaoru Fujimoto; Tsutomu Shikada, both of Tokyo, all of Japan

[73] Assignee: Ishikawajima-Harima Jukogyo Kabushiki Kaisha, Tokyo, Japan

[21] Appl. No.: 510,891

[22] Filed: Jul. 5, 1983

[30] Foreign Application Priority Data

Jul. 9, 1982 [JP] Japan ............................... 57-118399

[51] Int. Cl.³ .......................... C01B 21/00; B01J 8/00
[52] U.S. Cl. ................................. 423/235; 423/210.5; 423/239; 423/244
[58] Field of Search ................. 423/235, 235 D, 239, 423/239 A, 210.5, 244 A, 244 R

[56] References Cited

U.S. PATENT DOCUMENTS 3,671,185  6/1972  Lefrancois et al. ................. 423/235
4,107,272  8/1978  Mori et al. .......................... 423/239

Primary Examiner—Gregory A. Heller

[57] ABSTRACT

A process for purifying exhaust gases is disclosed. Exhaust gases discharged when coal or petroleum is burned are forced to pass through reaction media consisting of molten salts whose major component is a hydrogensulfate or hydrogensulfates, whereby desulfurization and denitration can be effected by one step. Harmful compounds such as sulfur oxides, nitrogen oxides and dust particles in the exhaust gases can be efficiently removed and the purified gases can be smoothly diffused.

10 Claims, No Drawings

METHOD FOR PURIFYING EXHAUST GASES WITH HYDROGENSULFATES

FIELD OF THE INVENTION

The present invention relates to a process for purifying exhaust gases discharged from a stationary source such as a petroleum or coal fired heating furnace, boiler or iron-ore sintering furnace and more particularly a process for removing sulfur oxides such as $SO_2$ and $SO_3$ and nitrogen oxides such as NO and $NO_2$ effectively and efficiently from the exhaust gases and for absorbing and removing dust particles entrained in the exhaust gases by utilizing molten hydrogensulfates as reaction media as well as absorbant.

BACKGROUND OF THE INVENTION

So far the harmful compounds such as sulfur oxides and nitrogen oxides in the exhaust gases discharged from stationary sources have been processed by two steps. For instance, in the presence of solid catalysts nitrogen oxides in the exhaust gases are reacted with ammonia (which is fed separately) to convert into nitrogen. Thereafter, by means of a wet type desulfurization process, sulfur oxides are removed in the form of sulfates. This process has been technically well matured because of high desulfurization and denitration rates and because of efficient removal of particles.

However, the above-described process is carried out in two steps so that a plurality of equipments are needed. As a result, a considerably high cost and a long period are needed to construct this process. Furthermore, the wet type desulfurization step is carried out at low temperatures ranging from 55° to 60° C. so that the diffusion of purified gases discharged from a stack is not satisfactory. It has a further disadvantage that after the purification process, the purified gases must be heated up by means of heat-exchange or by burning fuel gas if enough diffusion of the stack gas is requested. Moreover, the process has another defect that a large amount of water must be supplied to make up the loss of water from the wet type desulfurization equipment as steam.

The inventors made extensive studies and experiments in order to develop a novel exhaust-gas purifying process which not only has the above described advantages of the prior art process but also can substantially overcome the above-described disadvantages or defects thereof. That is, the inventors made an extensive research-and-development in order to provide a process which can maintain high desulfurization and denitration rates and the capability of removing dust particles (which is one of the advantages of the wet type processes) and which can accomplish both desulfurization and denitration by one step and can process the exhaust gases at such high temperature that the purified gases have enough diffusing force. The inventors found out that molten alkali hydrogensulfate, ammonium hydrogensulfate or mixture thereof can be satisfactorily and advantageously utilized as a reaction medium for processing the exhaust gases. The present invention is therefore based upon this discovery.

DETAILED DESCRIPTION OF THE INVENTION

The present invention has for its object to provide a process for purifying the exhaust gases of the type in which in the presence of catalysts, sulfur oxides and/or nitrogen oxides are removed from the exhaust gases, characterized in that molten salts whose major component consists of one or more hydrogensulfates selected from the group consisting of lithium hydrogensulfate, sodium hydrogensulfate, potassium hydrogensulfate and ammonium hydrogensulfate are used as reaction media.

As described above, according to the present invention, molten salts whose major component is hydrogensulfates are used as reaction media. Hydrogensulfates are selected from a group consisting of lithium hydrogensulfate, sodium hydrogensulfate, potassium hydrogensulfate and ammonium hydrogensulfate. They may be used singly, but it is preferable that two or more of them are mixed because the melting point is lowered so that molten salts having a high degree of fluidity even at temperature less than 100° C. may be obtained. In general, these reaction media have a high solubility so that they can trap and dissolve various compounds. For instance, the reaction media can not only trap alkali metal salts such as sodium, potassium and the like which exist in large quantities in coal dusts but also react with sulfur oxides so as to convert them into reaction media. Moreover, vanadium, nickel and the like which exist in the exhaust gases of petroleum heavy oil burning are also trapped to act as catalysts.

According to the present invention, the exhaust gases to be treated are introduced into the above-described reaction media so that sulfur oxides and nitrogen oxides are satisfactorily removed from the exhaust gases. The temperature of the reaction media must be such that the reaction media must exhibit a sufficient fluidity; that is, the temperature of the reaction media must be higher than the melting point of hydrogensulfates used. For instance, in the case of $NH_4HSO_4$—$NaHSO_4$ system the temperature must be higher than about 60° C. and in the case of $LiHSO_4$—$NaHSO_4$ system the temperature must be higher than about 50° C. In practice it is preferable that the temperature be between 60° and 400° C. and more preferably between 80° and 350° C. from the standpoint of rate of reaction.

According to the present invention, both or either of desulfurization and denitration proceeds. Dusulfurization is such that sulfur oxides such as $SO_2$, $SO_3$ and the like in the exhaust gases are converted into unharmful materials in the reaction media. That is, the following reactions proceed:

$$SO_2 + \tfrac{1}{2}O_2 \rightarrow SO_3 \tag{1}$$

$$SO_3 + H_2O \rightarrow H_2SO_4 \tag{2}$$

$$SO_3 + M_2SO_4 + H_2O \rightarrow 2\,MHSO_4 \tag{3}$$

where M is an alkali metal or ammonium $$H_2SO_4 + NH_3 \rightarrow NH_4HSO_4 \tag{4}$$

In the desulfurization reactions described above, oxygen and water are generally contained in the exhaust gases to be treated so that they are not needed to be supplied, but the reactions (3) and (4) proceed when sulfate ($M_2SO_4$) or ammonia is added to the reaction systems. That is, in the case of the reaction (3), when sulfate is added to the reaction media, $SO_3$ existing in the exhaust gases or produced as a result of the oxidation of $SO_2$ reacts with sulfates to be fixed as one of the components of the reaction medium itself. Therefore when the reaction media contain alkali metal sulfates, the reaction media increase as the desulfurization proceeds without any accumulation of compounds which inhibit the reaction. It follows therefore that the continuous operation can be carried out smoothly for a long period of time if the increased reaction media are suitably taken out. In the case of the reaction (4), when ammonia is added to the reaction system, SO$_2$ and SO$_3$ in the exhaust gases are converted into ammonium hydrogensulfate (NH$_4$HSO$_4$). That is, SO$_2$ and SO$_3$ become reaction media themselves. If, instead of adding ammonia, especially ammonium sulfate ((NH$_4$)$_2$SO$_4$) is added as a sulfate, the similar reaction proceeds. The increased reaction media resulting from the reactions (3) and (4) are taken out from the reaction system and are subjected to react with calcium hydroxide directly or after being dissolved in water to produce gypsum, whereby hydroxides of alkali materls or ammonia may be recovered.

Denitration in accordance with the present invention is such that nitrogen oxides such as NO and the like are converted into unharmful compounds in the reaction media and then removed. That is, the following chemical reaction proceeds:

$$NO + NH_3 + \tfrac{1}{4}O_2 \rightarrow N_2 + 3/2 H_2O \quad (5)$$

$$NO + H_2 \rightarrow \tfrac{1}{2}N_2 + H_2O \quad (6)$$

$$NO + CO \rightarrow \tfrac{1}{2}N_2 + CO_2 \quad (7)$$

In the case of the reactions (6) and (7), they proceed when hydrogen gas and carbon monoxide are contained in the exhaust gases. However, some exhaust gases do not contain hydrogen gas and carbon monoxide so that ammonia must be added to the reaction system. In order to proceed the reaction (5), it is effective to add ammonium salts such as ammonium sulfate, ammonium phosphate and the like to molten hydrogensulfates which are reaction media, in addition to ammonia and ammonium hydrogensulfate.

As described above, according to the present invention, desulfurization and denitration are effected so that sulfur oxides and nitrogen oxides are removed or converted into unharmful compounds, but other compounds such as nitrogen gas, carbon dioxide and steam in the exhaust gases are not affected at all so that they pass through the reaction zone of molten salts and then are discharged out of the reaction system. Part of steam contained in the exhaust gases participate in the desulfurization process as described in the reactions (2) and (3). If a very small amount of the oxygen does exist in the exhaust gases, the reactions (1) and (5) are promoted so that desulfurization and denitration are also accelerated.

According to the present invention, the exhaust gases to be treated are passed through molten salts whose major components are hydrogensulfates. It is essential however to add desulfurization and denitration catalysts in the molten salts which are reaction media. No special limitations are imposed upon the selection of catalysts and therefore various catalysts may be used. In practice, supported vanadium oxide catalysts, which have been long used in the prior art wet type denitration processes, vanadium oxide, vanadyl sulfate, vanadium hydrogensulfate or vanadates which may be soluble into molten salts reaction media, are very effective in desulfurization and denitration. Solid catalysts such as copper, iron, molybdenum, titanium and the like which have been known to be effective in denitration may be used in the present invention. Other than vanadium compounds, sulfates of transition metals are also used as catalysts for desulfurization. It is preferable to use vanadium compounds in combination with sulfates of transition metals because synergetic effects can be attained.

In addition to the above-described catalysts and various sulfates, according to the present invention, various salts and compounds may be dissolved or suspended so that desulfurization and denitration may be accelerated. Simultaneously sulfuric acid mist in the exhaust gases may be effectively trapped in the present molten salts.

As described above, according to the present invention, sulfur oxides and nitrogen oxides in the exhaust gases can be efficiently removed. The exhaust gases can be treated by passing them through molten salts liquid which are reaction media so that almost all dust particles entrained in the exhaust gases may be also entrapped. In addition, since the treatment temperature is between 60° and 400° C. which is considerably higher and broader than the temperature used in the prior art wet type exhaust gases purification processes, the purified gases can diffuse readily from a stack even without its heating after the treatment. Thus, the very efficient treatment of exhaust gases can be carried out.

It follows therefore that the process in accordance with the present invention can be effectively and widely used for purifying exhaust gases discharged mainly from coal- or petroleum fired heating furnaces, boilers, iron-ore sintering furnaces and the like.

The present invention will become more apparent from the following description of some Examples.

EXAMPLE 1

A 188 g of ammonium hydrogensulfate and 222 g of sodium hydrogensulfate were heated, mixed and melted, whereby a reaction medium was prepared. A 20 g of vanadium pentoxide was added as catalyst and the reaction medium was charged into a reactor (an agitated bubble type) and stirred. At the reaction temperature of from 130° to 190° C., reaction gases with the following composition were made to flow at a flow rate of 1 l/min (at 25° C.) and the outlet concentrations of NO and SO$_2$ were measured. The results were shown in Table 1.

Composition: NO 300 ppm, NH$_3$ 450 ppm, SO$_2$ 400 ppm, O$_2$ 5%, H$_2$O 10%, N$_2$ balance.

EXAMPLE 2

Following the procedure of Example 1, the reaction medium was prepared and 20 g of ammonium metavanadate or vanadyl sulfate was added as a catalyst. Under the same conditions as Example 1, the reaction was carried out. The results were shown in Table 1.

EXAMPLE 3

A 100 g of commercially available titania was added to an oxalic acid solution of vanadium pentoxide (that is, the solution obtained by dissolving 20 g of vanadium pentoxide into the aqueous solution of 5% by weight of oxalic acid). The solution was evaporated and then dried. The dried solute was heated in an air for 3 hours at 350° C., whereby a catalyst was prepared. A 20 g of the thus obtained catalysts was suspended in the reaction medium prepared by following the procedure of Example 1. Under the same conditions as Example 1, the reaction was carried out. The results were shown in Table 1.

EXAMPLE 4

The reaction medium and the main catalyst were prepared by the following the same procedure of Example 1. As an additional catalyst or promoter, 4 g of titanic sulfate, zirconium sulfate, cupric sulfate, lead sulfate or stannous sulfate was added. Under the same conditions as Example 1, the reaction was carried out. The results were shown in Table 1.

EXAMPLE 5

Following the procedure of Example 1, the reaction medium and the main catalyst were prepared. As an additional catalyst or promoter, 20 g of titanic sulfate or cupric sulfate was added. Under the same conditions as Example 1, the reaction was carried out. The results were shown in Table 1.

EXAMPLE 6

Following the procedure of Example 1, the reaction medium was prepared. As a catalyst, 20 g of titanic sulfate or cupric sulfate was added. Under the same conditions as Example 1, the reaction was carried out. The results were shown in Table 1.

EXAMPLE 7

Following the procedure of Example 1, the reaction medium and the main catalyst were prepared. As additional catalyst or promoters, 4 g of titanic sulfate and 4 g of cupric sulfate, or 4 g of titanic sulfate and 4 g of zirconium sulfate, or 4 g of titanic sulfate and 4 g of ferrous sulfate were added. Under the same conditions as Example 1, the reaction was carried out. The results were shown in Table 1.

EXAMPLE 8

A 376 g of ammonium hydrogensulfate, 444 g of sodium hydrogensulfate or 332 g of lithium hydrogensulfate was heated and melted to prepare a reaction medium. Under the same conditions as Example 1, the reaction was carried out. The results were shown in Table 2.

EXAMPLE 9

The reaction was carried out under the same conditions as Example 1 except that a reaction medium consisted of ammonium hydrogensulfate and sodium hydrogensulfate with different ratios. The results were shown in Table 3.

EXAMPLE 10

The reaction was carried out under the same conditions as Example 1 except that a reaction medium obtained by heating and mixing 188 g of ammonium hydrogensulfate and 220 g of potassium hydrogensulfate was used. The results were shown in Table 3.

EXAMPLE 11

A reaction medium was prepared by heating and mixing 188 g of ammonium hydrogensulfate and 208 g of lithium hydrogensulfate. Under the same conditions as Example 1, the reaction was carried out. The results were shown in Table 3.

EXAMPLE 12

The reaction was carried out under the same conditions as Example 1 except that the reaction medium consisted of ammonium hydrogensulfate and lithium hydrogensulfate with different ratios. The results were shown in Table 3.

EXAMPLE 13

The reaction was carried out under the same conditions as Example 1 except that a reaction medium prepared by heating and mixing 222 g of sodium hydrogensulfate and 166 g of lithium hydrogensulfate was used. The results were shown in Table 3.

EXAMPLE 14

Following the procedure of Example 13, the reaction medium and the main catalyst were prepared. As an additional cayalyst or promoter, 4 g of titanic sulfate, zirconium sulfate or cupric sulfate was added. The reaction was carried out under the same conditions as Example 1. The results were shown in Table 3.

EXAMPLE 15

The reaction was carried out under the same conditions as Example 1 except that a reaction medium was prepared by heating and mixing 188 g of ammonium hydrogensulfate, 139 g of sodium hydrogensulfate and 104 g of lithium sulfate. The results were shown in Table 3.

EXAMPLE 16

The reaction was carried out under the same conditions as Example 1 except that a reaction medium was prepared by heating and mixing 169 g of ammonium hydrogensulfate, 21 g of ammonium sulfate and 200 g of sodium hydrogensulfate, or 169 g of ammonium hydrogensulfate, 21 g of ammonium sulfate and 166 g of lithium hydrogensulfate. The results were shown in Table 3.

EXAMPLE 17

A reaction medium was prepared by heating, mixing and melting 169 g of ammonium hydrogensulfate, 21 g of ammonium sulfate and 220 g of potassium hydrogensulfate, or 188 g of ammonium hydrogensulfate, 23 g of sodium sulfate and 166 g of lithium hydrogensulfate. A 20 g of vanadium pentoxide was added as a catalyst. The reaction medium was charged into a reactor (an agitated bubble type) and stirred. At the reaction temperature of from 130° to 190° C., the reaction gases with the following composition were made to flow through the reaction medium at the rate of 1 l/min (at 25° C.). The outlet concentration of $SO_2$ was measured. The results were shown in Table 4.

Composition: NO 300 ppm, $SO_2$ 400 ppm, $O_2$ 5%, $H_2O$ 10%, $N_2$ balance.

TABLE 1

| Example | Main Catalyst Material | Added amount (g) | Promoter Material | Added amount (g) | Promoter Material | Added amount (g) | Conversion of NO (%) 130° C. | 160° C. | 190° C. | Conversion of $SO_2$ (%) 130° C. | 160° C. | 190° C. |
|---|---|---|---|---|---|---|---|---|---|---|---|---|
| 1 | $V_2O_5$ | 20 | — | — | — | — | 13.7 | 22.4 | 40.0 | 34.9 | 33.0 | 27.8 |

TABLE 1-continued

| | Main Catalyst | | Catalyst Promoter | | Promoter | | Conversion of NO (%) | | | Conversion of SO$_2$ (%) | | |
|---|---|---|---|---|---|---|---|---|---|---|---|---|
| Example | Material | Added amount (g) | Material | Added amount (g) | Material | Added amount (g) | 130° C. | 160° C. | 190° C. | 130° C. | 160° C. | 190° C. |
| 2a | NH$_4$VO$_3$ | 20 | — | — | — | — | 13.7 | 22.3 | 38.0 | 30.7 | 32.0 | 26.5 |
| 2b | VOSO$_4$ | 20 | — | — | — | — | 10.5 | 20.7 | 35.6 | 31.9 | 30.5 | 27.2 |
| 3 | V$_2$O$_5$—TiO$_2$ | 20 | — | — | — | — | 8.8 | 10.7 | 13.5 | 23.8 | 24.5 | 22.1 |
| 4a | V$_2$O$_5$ | 20 | Ti(SO$_4$)$_2$ | 4 | — | — | 16.3 | 22.8 | 48.1 | 61.1 | 62.3 | 45.3 |
| 4b | V$_2$O$_5$ | 20 | Zr(SO$_4$)$_2$ | 4 | — | — | 14.1 | 24.5 | 45.3 | 62.4 | 62.4 | 52.9 |
| 4c | V$_2$O$_5$ | 20 | CuSO$_4$ | 4 | — | — | 13.3 | 22.7 | 40.0 | 60.6 | 58.7 | 59.9 |
| 4d | V$_2$O$_5$ | 20 | PbSO$_4$ | 4 | — | — | 12.1 | 21.3 | 42.4 | 60.9 | 60.9 | 58.1 |
| 4e | V$_2$O$_5$ | 20 | SnSO$_4$ | — | — | 12.3 | 16.7 | 40.1 | 58.6 | 58.6 | 58.9 | |
| 5a | V$_2$O$_5$ | 20 | Ti(SO$_4$)$_2$ | 20 | — | — | 29.7 | 35.3 | 55.9 | 65.7 | 67.1 | 65.9 |
| 5b | V$_2$O$_5$ | 20 | CuSO$_4$ | 20 | — | — | 13.9 | 23.6 | 41.7 | 74.1 | 74.1 | 65.7 |
| 6a | Ti(SO$_4$)$_2$ | 20 | — | — | — | — | 0 | 0 | 1.1 | 44.3 | 46.1 | 37.5 |
| 6b | CuSO$_4$ | 20 | — | — | — | — | 2.3 | 4.3 | 6.6 | 58.0 | 61.4 | 44.3 |
| 7a | V$_2$O$_5$ | 20 | Ti(SO$_4$)$_2$ | 4 | CuSO$_4$ | 4 | 11.6 | 20.4 | 42.0 | 72.2 | 72.2 | 70.0 |
| 7b | V$_2$O$_5$ | 20 | Ti(SO$_4$)$_2$ | 4 | Zr(SO$_4$)$_2$ | 4 | 5.6 | 14.7 | 34.4 | 60.7 | 58.9 | 44.4 |
| 7c | V$_2$O$_5$ | 20 | Ti(SO$_4$)$_2$ | 4 | FeSO$_4$ | 4 | 8.8 | 19.1 | 35.3 | 61.4 | 63.6 | 62.5 |

TABLE 2

| | Reaction medium | | Catalyst | | Conversion of NO (%) | | | Conversion of SO$_2$ (%) | | |
|---|---|---|---|---|---|---|---|---|---|---|
| Example | Material | Added amount (g) | Material | Added amount (g) | 130° C. | 160° C. | 190° C. | 130° C. | 160° C. | 190° C. |
| 8a | NH$_4$HSO$_4$ | 376 | V$_2$O$_5$ | 20 | — | 29.5 | 48.6 | — | 32.4 | 25.1 |
| 8b | NaHSO$_4$ | 444 | V$_2$O$_5$ | 20 | 9.7 | 19.6 | 35.5 | 40.7 | 38.2 | 31.9 |
| 8c | LiHSO$_4$ | 332 | V$_2$O$_5$ | 20 | — | — | 78.6 | — | — | 43.8 |

TABLE 3

| | Reaction medium | | Catalyst Main Catalyst | | Promotor | | Conversion of NO (%) | | | Conversion of SO$_2$ (%) | | |
|---|---|---|---|---|---|---|---|---|---|---|---|---|
| Example | Material | Used amount (g) | Material | Added amount (g) | Material | Added amount (g) | 130° C. | 160° C. | 190° C. | 130° C. | 160° C. | 190° C. |
| 9a | NH$_4$HSO$_4$ NaHSO$_4$ | 126 296 | V$_2$O$_5$ | 20 | — | — | — | 20.0 | — | — | 35.1 | — |
| 9b | NH$_4$HSO$_4$ NaHSO$_4$ | 250 148 | V$_2$O$_5$ | 20 | — | — | — | 23.8 | — | — | 34.5 | — |
| 9c | NH$_4$HSO$_4$ NaHSO$_4$ | 342 40 | V$_2$O$_5$ | 20 | — | — | — | 27.7 | — | — | 32.1 | — |
| 10 | NH$_4$HSO$_4$ KHSO$_4$ | 188 220 | V$_2$O$_5$ | 20 | — | — | 5.6 | 11.7 | 28.3 | 53.3 | 51.2 | 50.0 |
| 11 | NH$_4$HSO$_4$ LiHSO$_4$ | 188 208 | V$_2$O$_5$ | 20 | — | — | 43.3 | 59.3 | 73.5 | 37.0 | 34.1 | 32.9 |
| 12a | NH$_4$HSO$_4$ LiHSO$_4$ | 250 111 | V$_2$O$_5$ | 20 | — | — | 22.5 | 38.6 | 61.1 | 30.2 | 28.6 | 27.3 |
| 12b | NH$_4$HSO$_4$ LiHSO$_4$ | 126 221 | V$_2$O$_5$ | 20 | — | — | 40.2 | 52.3 | 76.8 | 51.2 | 46.0 | 46.4 |
| 13 | NaHSO$_4$ LiHSO$_4$ | 222 166 | V$_2$O$_5$ | 20 | — | — | 60.3 | 71.1 | 80.1 | 42.9 | 46.4 | 46.4 |
| 14a | NaHSO$_4$ LiHSO$_4$ | 222 166 | V$_2$O$_5$ | 20 | Ti(SO$_4$)$_2$ | 4 | 57.9 | 74.1 | 82.3 | 48.9 | 52.2 | 46.0 |
| 14b | NaHSO$_4$ LiHSO$_4$ | 222 166 | V$_2$O$_5$ | 20 | Zr(SO$_4$)$_2$ | 4 | 66.9 | 81.0 | 88.3 | 53.5 | 44.2 | 37.5 |
| 14c | NaHSO$_4$ LiHSO$_4$ | 222 166 | V$_2$O$_5$ | 20 | CuSO$_4$ | 4 | 48.8 | 68.4 | 84.0 | 60.4 | 61.5 | 49.5 |
| 15 | NH$_4$HSO$_4$ NaHSO$_4$ LiHSO$_4$ | 188 139 104 | V$_2$O$_5$ | 20 | — | — | 19.3 | 31.9 | 59.2 | 40.5 | 44.2 | 43.8 |
| 16a | NH$_4$HSO$_4$ (NH$_4$)$_2$SO$_4$ NaHSO$_4$ | 169 21 200 | V$_2$O$_5$ | 20 | — | — | 21.3 | 36.7 | 49.5 | 37.2 | 35.4 | 33.8 |
| 16b | NH$_4$HSO$_4$ (NH$_4$)$_2$SO$_4$ LiHSO$_4$ | 169 21 166 | V$_2$O$_5$ | 20 | — | — | 50.5 | 67.3 | 85.2 | 40.0 | 38.7 | 35.5 |

TABLE 4

| Example | Reaction medium Material | Used amount (g) | Catalyst Material | Added amount (g) | Conversion of $SO_2$ (%) 130° C. | 160° C. | 190° C. |
|---|---|---|---|---|---|---|---|
| 17a | $NH_4HSO_4$ | 169 | $V_2O_5$ | 20 | 60.7 | 61.3 | 59.2 |
|  | $(NH_4)_2SO_4$ | 21 |  |  |  |  |  |
|  | $KHSO_4$ | 222 |  |  |  |  |  |
| 17b | $NH_4HSO_4$ | 188 | $V_2O_5$ | 20 | 48.3 | 47.1 | 44.5 |
|  | $NaHSO_4$ | 200 |  |  |  |  |  |
|  | $Na_2SO_4$ | 23 |  |  |  |  |  |
| 17c | $NaHSO_4$ | 200 | $V_2O_5$ | 20 | 53.1 | 54.9 | 50.0 |
|  | $Na_2SO_4$ | 23 |  |  |  |  |  |
|  | $LiHSO_4$ | 166 |  |  |  |  |  |

What is claimed is:

1. A process for removing either sulfur oxides or nitrogen oxides or both from exhaust gases containing the same which comprises contacting said exhaust gases, at a temperature of from about 60° C. to 400° C. with a reaction medium containing as a major component at least one molten salt selected from the group consisting of lithium hydrogensulfate, sodium hydrogensulfate, potassium hydrogen sulfate and ammonium hydrogensulfate, in the presence of a vanadium catalyst selected from the group consisting of vanadium oxide, vanadylsulfate, vanadium hydrogensulfate, and vanadates.

2. A process according to claim 1 wherein ammonia is added to said reaction medium.

3. A process according to claim 1 wherein an ammonium salt is added to said reaction medium.

4. A process according to claim 1 wherein ammonia and an ammonium salt are added to said reaction medium.

5. A process according to claim 1 wherein a sulfate of a transition metal is added to said reaction medium.

6. A process according to claim 3 wherein the ammonium salt is ammonium hydrogensulfate which is the reaction medium.

7. A process according to claim 4 wherein the ammonium salt is ammonium hydrogensulfate which is the reaction medium.

8. A process according to claim 2 wherein a sulfate of a transition metal is added to the reaction medium.

9. A process according to claim 3 wherein a sulfate of a transition metal is added to the reaction medium.

10. A process according to claim 4 wherein a sulfate of a transition metal is added to the reaction medium.

* * * * *